US012728445B2

(12) United States Patent
Wu et al.

(10) Patent No.: US 12,728,445 B2
(45) Date of Patent: Sep. 8, 2026

(54) METHOD AND APPARATUS TO CLEAN SUBSTRATE WITH ATOMIZING NOZZLE

(71) Applicant: Applied Materials, Inc., Santa Clara, CA (US)

(72) Inventors: Haosheng Wu, San Jose, CA (US); Shou-Sung Chang, Mountain View, CA (US); Hui Chen, San Jose, CA (US); Chih Chung Chou, San Jose, CA (US); Sih-Ling Yeh, Sunnyvale, CA (US); Emily Drauss, Santa Clara, CA (US); Elton Zhong, San Jose, CA (US); Chad Pollard, San Jose, CA (US); Songling Shin, Sunnyvale, CA (US); Jianshe Tang, San Jose, CA (US); Jeonghoon Oh, Saratoga, CA (US)

(73) Assignee: Applied Materials, Inc., Santa Clara, CA (US)

( * ) Notice: Subject to any disclaimer, the term of this patent is extended or adjusted under 35 U.S.C. 154(b) by 390 days.

(21) Appl. No.: 18/206,367

(22) Filed: Jun. 6, 2023

(65) Prior Publication Data

US 2024/0408650 A1 Dec. 12, 2024

(51) Int. Cl.

*B08B 3/02* (2006.01)
*B05B 7/24* (2006.01)

(Continued)

(52) U.S. Cl.

CPC ............ *B08B 3/022* (2013.01); *B05B 7/2489* (2013.01); *B08B 13/00* (2013.01); *B24B 37/00* (2013.01);

(Continued)

(58) Field of Classification Search

CPC ....... B08B 3/022; B08B 13/00; B05B 7/2489; B24B 57/04; B24B 53/017

See application file for complete search history.

(56) References Cited

U.S. PATENT DOCUMENTS

| | | | |
|---|---|---|---|
| 5,738,574 | A | 4/1998 | Tolles et al. |
| 8,740,667 | B2 | 6/2014 | Kodera et al. |

(Continued)

FOREIGN PATENT DOCUMENTS

| | | | | |
|---|---|---|---|---|
| KR | 10-0897226 | | 5/2009 | |
| KR | 100897226 | B1 * | 5/2009 | ............ B24B 37/30 |
| WO | WO 2021/044694 | A1 | 3/2021 | |

OTHER PUBLICATIONS

KR100897226 translation (Year: 2009).*

(Continued)

*Primary Examiner* — Michael E Barr
*Assistant Examiner* — Lauren G Orta
(74) *Attorney, Agent, or Firm* — Fish & Richardson P.C.

(57) ABSTRACT

A chemical mechanical polishing system includes a first polishing station including a first platen to support a first polishing pad, a transfer station to receive a substrate from a robot, a carrier head movable on a predetermined path from the polishing station to the transfer station, a gas flow regulator having an input for a carrier gas, a liquid flow regulator having an input for a cleaning liquid, and a fluid jet cleaner at a position along the predetermined path. The fluid jet cleaner includes an atomizer nozzle including an input port coupled to the gas flow regulator, an injection port coupled to the liquid flow regulator, and an output port positioned to spray the cleaning liquid entrained in the carrier gas onto the substrate held by the carrier head when the carrier head is located above the fluid jet cleaner.

21 Claims, 5 Drawing Sheets

(51) Int. Cl.

| | |
|---|---|
| ***B08B 13/00*** | (2006.01) |
| ***B24B 37/00*** | (2012.01) |
| ***B24B 53/007*** | (2006.01) |
| ***B24B 53/017*** | (2012.01) |
| ***B24B 57/04*** | (2006.01) |

(52) U.S. Cl.
CPC .......... *B24B 53/007* (2013.01); *B24B 53/017* (2013.01); *B24B 57/04* (2013.01)

(56) References Cited

U.S. PATENT DOCUMENTS

| | | | | |
|---|---|---|---|---|
| 9,711,381 | B2 | 7/2017 | Ko et al. | |
| 2002/0048957 | A1 | 4/2002 | Yang et al. | |
| 2003/0216112 | A1* | 11/2003 | Gotze | B08B 1/36 451/72 |
| 2004/0235301 | A1* | 11/2004 | Wada | B24B 53/017 438/689 |
| 2008/0280453 | A1* | 11/2008 | Koelmel | H01L 21/67115 438/758 |
| 2009/0270015 | A1* | 10/2009 | D'Ambra | B24B 41/005 451/28 |
| 2010/0041316 | A1 | 2/2010 | Wang et al. | |
| 2012/0289133 | A1 | 11/2012 | Liu et al. | |
| 2014/0323017 | A1 | 10/2014 | Tang et al. | |
| 2016/0074994 | A1 | 3/2016 | Shinozaki | |
| 2020/0234995 | A1* | 7/2020 | Rangarajan | B24B 37/345 |
| 2020/0306920 | A1 | 10/2020 | Motoshima et al. | |
| 2020/0376523 | A1* | 12/2020 | Wu | B08B 3/106 |
| 2021/0046604 | A1 | 2/2021 | Wu et al. | |
| 2021/0154796 | A1* | 5/2021 | Zhang | B24B 37/26 |
| 2022/0281051 | A1* | 9/2022 | Fukunaga | B24B 37/005 |
| 2023/0008720 | A1* | 1/2023 | Ito | B24B 37/042 |

OTHER PUBLICATIONS

International Search Report and Written Opinion in International Appln. No. PCT/US2024/032776, dated Sep. 23, 2024, 11 pages.

Office Action in Taiwanese Appln. No. 113121020, mailed on May 29, 2025, 63 pages (with English machine translation).

* cited by examiner

METHOD AND APPARATUS TO CLEAN SUBSTRATE WITH ATOMIZING NOZZLE

FIELD OF THE DISCLOSURE

This disclosure relates to cleaning of substrates after chemical mechanical polishing.

BACKGROUND

An integrated circuit is typically formed on a substrate by the sequential deposition of conductive, semiconductive, or insulative layers on a silicon wafer. One fabrication step involves depositing a filler layer over a non-planar surface and planarizing the filler layer. For certain applications, the filler layer is planarized until the top surface of a patterned layer is exposed. A conductive filler layer, for example, can be deposited on a patterned insulative layer to fill the trenches or holes in the insulative layer. After planarization, the portions of the metallic layer remaining between the raised pattern of the insulative layer form vias, plugs, and lines that provide conductive paths between thin film circuits on the substrate. For other applications, such as oxide polishing, the filler layer is planarized, e.g., by polishing for a predetermined time period, to leave a portion of the filler layer over the nonplanar surface. In addition, planarization of the substrate surface is usually required for photolithography.

Chemical mechanical polishing (CMP) is one accepted method of planarization. This planarization method typically requires that the substrate be mounted on a carrier or polishing head. The exposed surface of the substrate is typically placed against a rotating polishing pad. The carrier head provides a controllable load on the substrate to push it against the polishing pad. An abrasive polishing slurry is typically supplied to the surface of the polishing pad.

During polishing, debris and slurry can stick to the surface of the substrate, resulting in defects. Therefore, after polishing the substrate can be transferred to a cleaning system, where the substrate undergoes cleaning, e.g., using one or more of a megasonic cleaner, a rotating brush cleaner, or a buff pad cleaner.

SUMMARY

In one aspect, a fluid jet cleaner includes an atomizer nozzle including an input port for a carrier gas, an injection port for a cleaning liquid, and an output port positioned to spray the cleaning liquid entrained in the carrier gas onto a substrate.

In another aspect, a fluid jet cleaner includes a nozzle having a convergent-divergent nozzle to spray a cleaning liquid onto a substrate.

In another aspect, a cleaning module includes a support to hold a substrate and a fluid jet cleaner having plurality of nozzle arranged in a line that extends on a radius of the substrate.

In another aspect, a cleaning fluid is sprayed from a nozzle at a speed of 100-1200 m/s onto a substrate to clean the substrate after polishing.

In another aspect, a chemical mechanical polishing system includes a first polishing station including a first platen to support a first polishing pad, a transfer station to receive a substrate from a robot, a carrier head movable on a predetermined path from the polishing station to the transfer station, a gas flow regulator having an input for a carrier gas, a liquid flow regulator having an input for a cleaning liquid, and a fluid jet cleaner at a position along the predetermined path. The fluid jet cleaner includes an atomizer nozzle including an input port coupled to the gas flow regulator, an injection port coupled to the liquid flow regulator, and an output port positioned to spray the cleaning liquid entrained in the carrier gas onto the substrate held by the carrier head when the carrier head is located above the fluid jet cleaner.

Particular implementations of the subject matter described in this specification can be implemented so as to realize one or more of the following technical advantages.

Defects can be reduced without significantly impacting throughput, thereby increasing yield. The cleaning nozzles can be integrated into the polishing system, so that the substrate is pre-cleaned before being transported to a dedicated cleaning system. This can permit a substrate to sit in the polishing system for a longer period of time without increased risk of defects, e.g., due to coagulation of slurry on the substrate, which can increase flexibility in scheduling of delivery of substrates to the cleaning system, which in turn can improve throughput.

The details of one or more embodiments are set forth in the accompanying drawings and the description below. Other features and advantages will be apparent from the description and drawings, and from the claims.

DESCRIPTION OF DRAWINGS

In the figures, like references indicate like elements.

DETAILED DESCRIPTION

As noted above, after polishing the substrate can be transferred to a cleaning system. However, some time is required to transport the substrate from the last polishing station, through a transfer station, to the cleaner. During this time, any debris or slurry on the substrate can dry and harden, thus becoming more difficult for the cleaner to remove. To combat this effect, the substrate can be sprayed with a mist of deionized (DI) water or water with chemistry, e.g., by nozzles at the transfer station. This can reduce the risk that the substrate dries out. In addition, the spray can rinse loose particles off the substrate. Although such rinsing might be considered a "cleaning" step, a spray at low pressure still leaves some particles on the substrate, which may not be acceptable as customer demand increases for lower defect rates.

A technique that can address this issue is to spray the substrate at relatively high pressure with a cleaning liquid from an atomizer, e.g., a converging diverging (CD) nozzle. This can provide a deeper clean than simply a spray of mist, e.g., from a nebulizer. In addition, one or more atomizers can be provided in the load cup of the transfer station or at an inter-platen cleaning station, so that the substrate can be cleaned while held by the carrier head and while moving along its expected path. Thus, this cleaning technique can be integrated into an existing polishing system without significantly impacting throughput.

Figure 1:
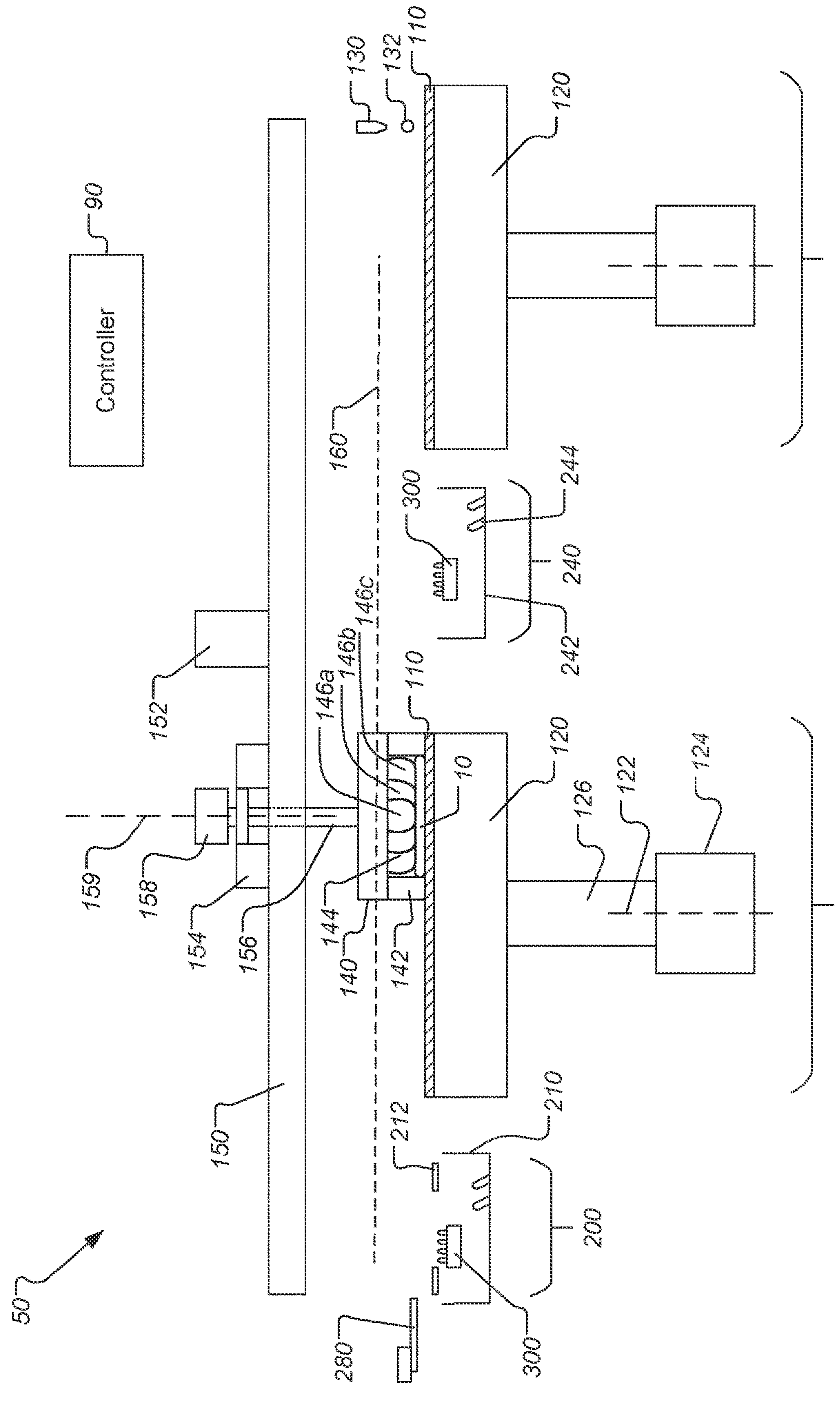
FIG. 1 illustrates a schematic cross-sectional view of an example polishing apparatus.

FIG. 1 illustrates an example of a polishing system 50. The polishing system 50 can include one or more polishing stations 100, a transfer station 200, and optionally an inter-platen cleaning station 250.

Each polishing station 100 of which includes a rotatable disk-shaped platen 120 on which a polishing pad 110 is situated. The polishing pad 110 can be a two-layer polishing pad with an outer polishing layer and a softer backing layer. At each polishing station 100, the platen 120 is operable to rotate about an axis of rotation 122. For example, a motor 124, e.g., a DC induction motor, can turn a drive shaft 126 to rotate the platen 120.

Each polishing station 100 can include a port 130 to dispense polishing liquid 132, such as abrasive slurry, onto the polishing pad 110 to the pad (the port is shown at only one station for simplicity). Each polishing station 100 can also include a polishing pad conditioner to abrade the polishing pad 110 to maintain the polishing pad 110 in a consistent abrasive state.

The polishing apparatus 50 also includes a carrier head 140 operable to hold a substrate 10. The carrier head 140 is movable between the transfer station 200 and the polishing station(s) 100. In particular, the carrier head 140 is suspended from a support structure 150, e.g., a carousel or track. In the case of a carousel, rotation of the carousel, e.g., by an actuator 152, can orbit the carrier head 140 about a central axis, which can carry the carrier head 140 in a predetermined path 160 from the transfer station 200 to each polishing station 100 in turn, and back to the transfer station 200. In the case of a track, the carrier head 140 can be driven along the track by an actuator 154. The track thus provides a predetermined path 160 for the carrier head to travel from the transfer station 200 to each polishing station 100 in turn, and back to the transfer station 200.

The carrier head 140 can include a retaining ring 142 to retain the substrate 10 below a flexible membrane 144. The carrier head 140 also includes one or more independently controllable pressurizable chambers defined by the membrane, e.g., three chambers 146*a*-146*c*, which can apply independently controllable pressurizes to associated zones on the flexible membrane 144 and thus on the substrate 10. Although only three chambers are illustrated in FIG. 1 for ease of illustration, there could be one or two chambers, or four or more chamber.

The carrier head 140 is also connected by a drive shaft 156 to a carrier head rotation motor 158, e.g., a DC induction motor, so that the carrier head can rotate about an axis 159. The combination of polishing liquid and the relative motion between the polishing pad 110 and substrate 10, e.g., provided by rotation of the carrier head 140 and platen 120, results in polishing of the exposed surface of the substrate 10.

Optionally each carrier head 140 can oscillate laterally during the polishing operation, e.g., on sliders on the support structure 150, or by rotational oscillation of the carousel itself, or by sliding along the track. In typical operation, the platen is rotated about its central axis of rotation 125, and each carrier head is rotated about its central axis 155 and translated laterally across the top surface of the polishing pad.

Figure 2B:
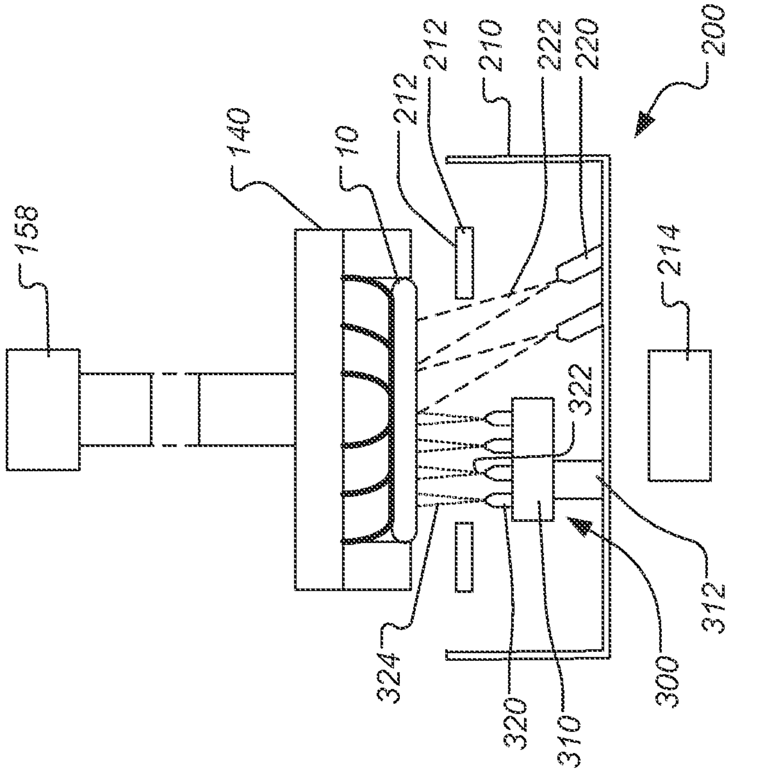
FIGS. 2A and 2B illustrate a schematic cross-sectional views of a transfer station.
Figure 2A:
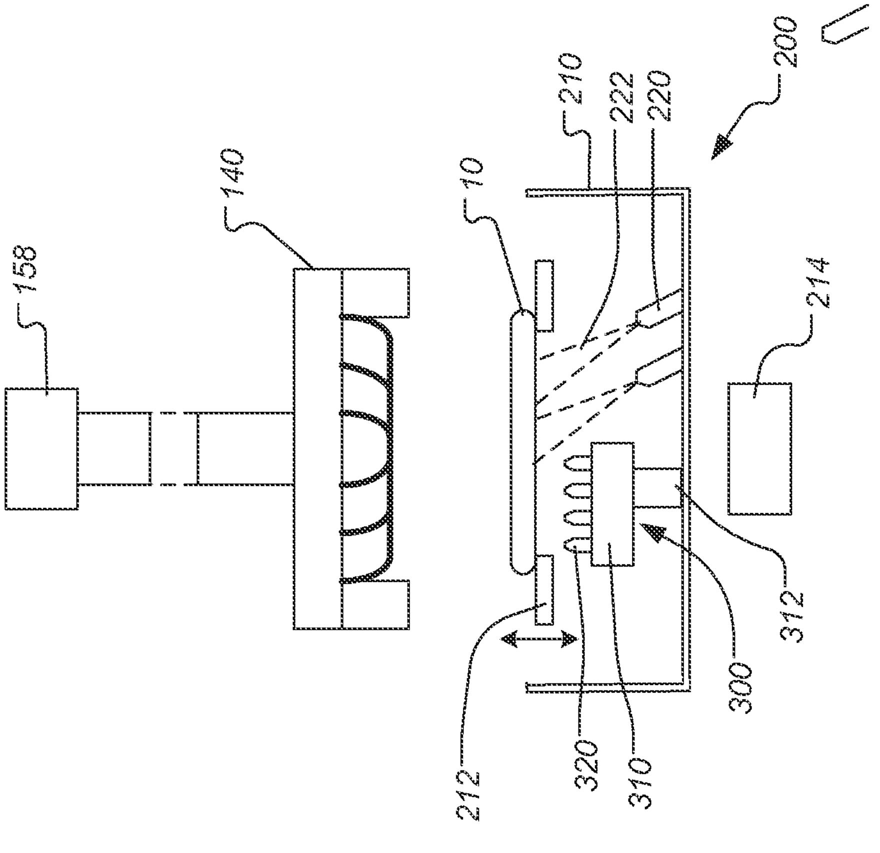

Referring to FIG. 2A, the substrate can be loaded into the carrier head 140 at a transfer station 200 that includes a load cup 210. The load cup can be vertically movable, e.g., by an actuator 214. Within the loading cup 210 is a substrate support 212, such as an edge support ring, lift pins, or a pedestal, to hold the substrate 10 before being loaded into and/or after being unloaded from the carrier head 140. The substrate support 212 can be rotatable and/or vertically actuatable, e.g., by the actuator 214. The substrate support 212 can be mounted on or be part of the load cup 210.

The transfer station 200 can optionally include one or more nozzles 220, e.g., nebulizers, positioned within the load cup 210 to spray a rinsing fluid 222, e.g., deionized water, on the substrate 10 as the substrate sits on the substrate support 212 and/or is held by the carrier head 140 (see FIG. 2B) at the transfer station 200. As nebulizers, the nozzles 220 spray a mist of the rinsing fluid; the mist impacts the substrate 10 at relatively low pressure or energy density (i.e., relative to the atomizers discussed below). For example, the flow rate of the rinsing fluid can be 50-500 cc/minute, and the mist can exit the nozzle with a speed of 0.1-100 m/s. The load cup 210 can serve as a splash guard to prevent liquid from the nozzles 220 from contaminating other components in the polishing system.

Returning to FIG. 1, in operation, a substrate 10 can be carried by an end effector 282 of a robot 280, e.g., from cassette, to the transfer station 200 and lowered onto the substrate support 212 (or the substrate support 212 could be raised to lift the substrate off the robot end effector 282). The end effector 282 of the robot retracts, and the substrate support 212 is lifted (or the carrier head 140 is lowered) to insert the substrate 10 into the carrier head 140. As noted above, the carrier head 140 moves along a predetermined path 160 to transport the substrate 10 to each polishing station 100 in turn. Then the carrier head 140 returns to the transfer station 200, where the substrate is deposited onto the substrate support 212 (or a substrate support of another load cup in the transfer station). The substrate is retrieved by the end effector 282 of the robot 280 and can be inserted into a dedicated cleaning system.

The polishing system 50 can include a controller 90, e.g., a programmed general purpose computer with a processor and non-transitory computer readable media with instructions to cause the computer to control the various components of the polishing system 50, e.g., motors 124, 158, actuators 152, 154, 214, 312, and flow regulators 342, 352.

One or more fluid jet cleaners 300 are located at one or more locations along the predetermined path 160 travelled by the carrier head 140. For example, a fluid jet cleaner 300 can be positioned at the transfer station 200, e.g., within the load cup 210. Alternatively or in addition, a fluid jet cleaner 300 can be positioned at an inter-platen station 240, i.e., at a location along the path 160 between two platens 120 at two different polishing stations 100 that are adjacent along the path 160. Alternatively or in addition, a fluid jet cleaner 300 can be positioned on the path 160 between the last polishing station 100 along the path 160 and the transfer station 200.

As shown in FIGS. 2A and 2B, each fluid jet cleaner 300 can include one or more nozzles 320, e.g., two to twenty nozzles, e.g., four nozzles, secured to a support 310, to spray a cleaning liquid 322 (see FIG. 2B) onto the substrate 10. In particular, each nozzle 320 is an atomizer. In an atomizer, liquid is injected into a carrier gas stream so that the carrier gas stream carries liquid droplets at high speed. In contrast, a nebulizer does not use a carrier gas; the liquid is forced at pressure through the nozzle and splits into droplets due to the shape of the nozzle.

The cleaning liquid 322 can be water, e.g., deionized (DI) water. In some implementations the carrier fluid is pure water. However, in some implementations other chemistry, such as etchants, surfactants, inhibitors, or pH buffers, can be present in the cleaning liquid 322. For example, the cleaning liquid can include water can be mixed with ammonia.

The carrier gas can be nitrogen, pure air (i.e., air filtered to remove particulates), carbon dioxide, an inert gas such as argon, or a combination thereof.

The nozzle(s) 320 are oriented to spray the cleaning liquid 322 vertically upward, e.g., at an angle of 0° to 60° relative to vertical (gravity). Thus, the cleaning liquid 322 impacts the substrate 10 at angle of 0° to 60° from the normal to the substrate surface. A potential advantage of having the substrate in a face-down position and spraying the cleaning liquid 322 upward is that the cleaning liquid will naturally fall away rather than having to flow across the top surface of the substrate, thus reducing the risk of beading or staining.

In operation, the carrier head 140 holds the substrate in a face-down position. The nozzle(s) 320 spray a cleaning liquid, e.g., DI water, onto the exposed face of the substrate 10. The cleaning liquid is impinges the substrate 10 with a relatively high pressure or energy density (i.e., relative to the nebulizers discussed above). For example, the flow rate of cleaning liquid 322 can be 5 to 500 cc/min, and the atomized fluid can exit the nozzle with a speed of 100-1200 m/s. In some implementations, the atomized fluid exits the nozzle at supersonic speeds, e.g., Mach 1-3.

Figure 3:
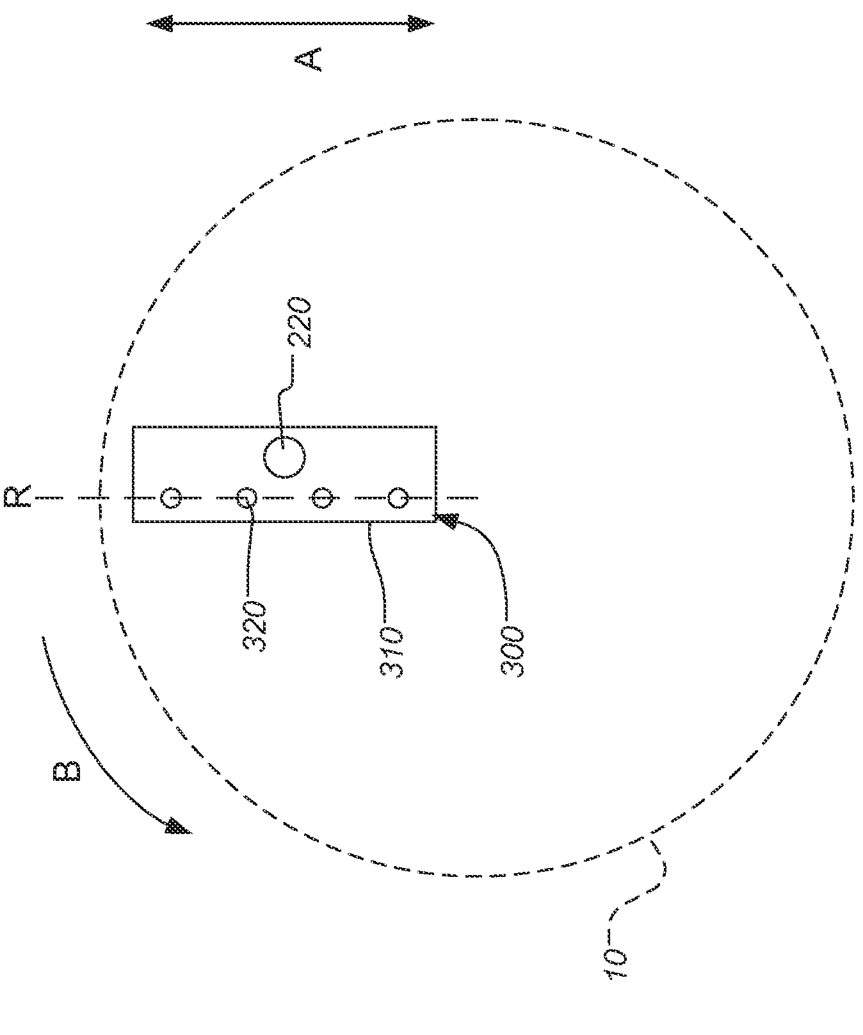
FIG. 3 illustrates a schematic top view of a substrate (in phantom) over a fluid jet cleaner.

In some implementations, the support 310 is vertically movable, e.g., by actuator 312, so as to adjust the distance between the nozzles 320 and the substrate 10. In some implementations, the support 310 and nozzles 320 are vertically fixed. The outlet port of the nozzle 320 can be located 15 to 100 mm from the surface of the substrate 10.

Where there are multiple nozzles 320, the nozzles can be positioned in a line. For example, as shown in FIG. 3, the carrier head may be positioned to hold the substrate 10 such that the line of nozzles 320 extend on a radius R that passes through the center of the substrate. In addition, the nozzles 320 can be spaced sufficiently far apart that the spray 324 of cleaning liquid 322 from adjacent nozzles 320 do not overlap (see FIG. 2B). In order to provide cleaning across entire surface of the substrate 10, the carrier head can rotate (shown by arrow A) and laterally oscillate (shown by arrow B) along the axis defined by the line of nozzles 320 (i.e., colinear with radius R). Alternately, or in addition to the lateral oscillation of the carrier head, the support 310 can be driven by an actuator 312 to oscillate along the axis defined by the line of nozzles 320. In either case, the magnitude of the lateral oscillation is sufficient for the spray 324 from the nozzles to scan and cover the entire radius of the substrate. In conjunction with rotation of the substrate 10, this can result in cleaning of substantially the entire surface of the substrate 10. The carrier head and substrate 10 can rotate at 1 to 250 rpm. The oscillation frequency can be between two and twenty times slower than the rotation rate.

Figure 4:
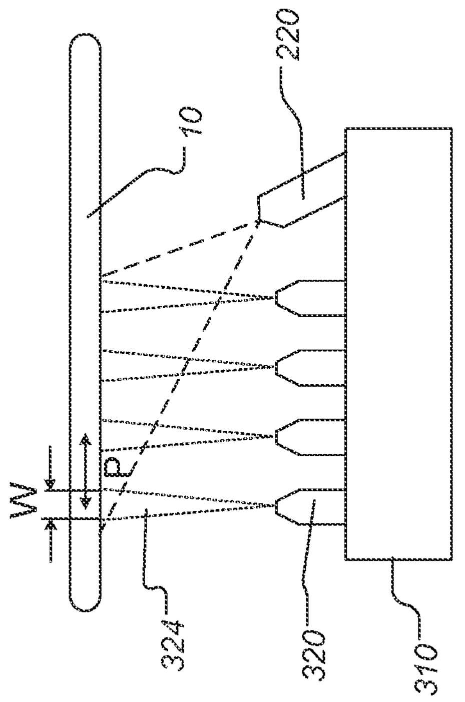
FIG. 4 illustrates a schematic side view of a substrate over a fluid jet cleaner.

Referring to FIG. 4, the ratio of rotation rate to oscillation frequency can be equal to or less than the ratio of the width W of the area impinged by a spray 324 from a nozzle 320 on the substrate to the to the pitch of the sprays 324 on the substrate. The ratio of rotation rate to oscillation frequency can be a non-integer.

Optionally, as shown in FIG. 4, one or more nebulizer nozzles 220 can be mounted on the support 310 for the atomizer nozzles 320. Although FIG. 4 illustrates the nebulizer nozzle 220 in line with the atomizer nozzles 320, in practice the nebulizer nozzle 220 can be offset along the direction of rotation, as shown in FIG. 3. Thus, although the rinsing fluid 222 and cleaning fluid 322 can be sprayed on the substrate simultaneously, they need not impinge the same area on the substrate 10.

Figure 5B:
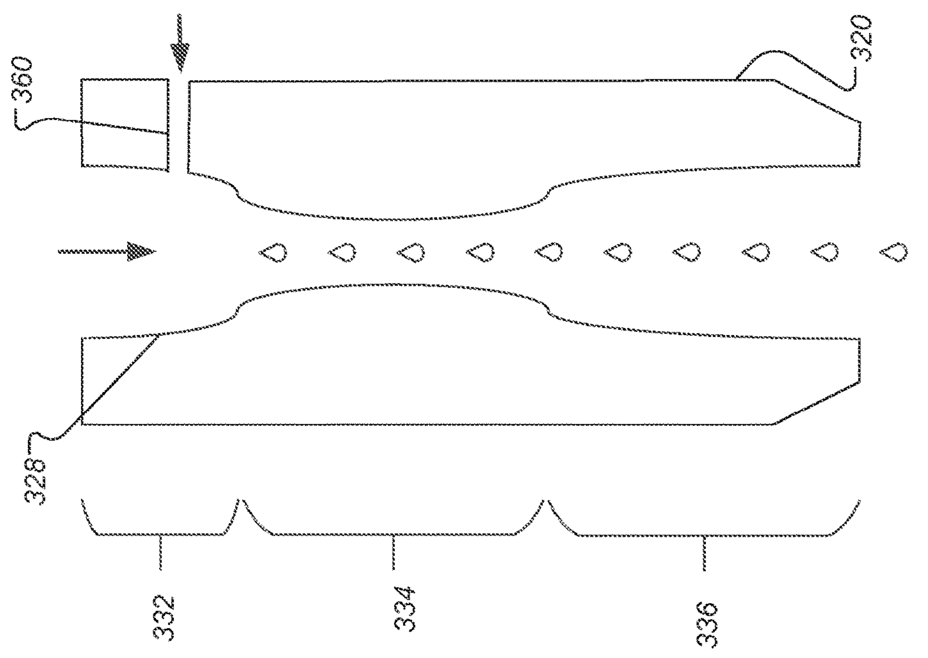
FIG. 5B illustrates a schematic cross-sectional view of another implementation of a convergent-divergent nozzle.
Figure 5A:
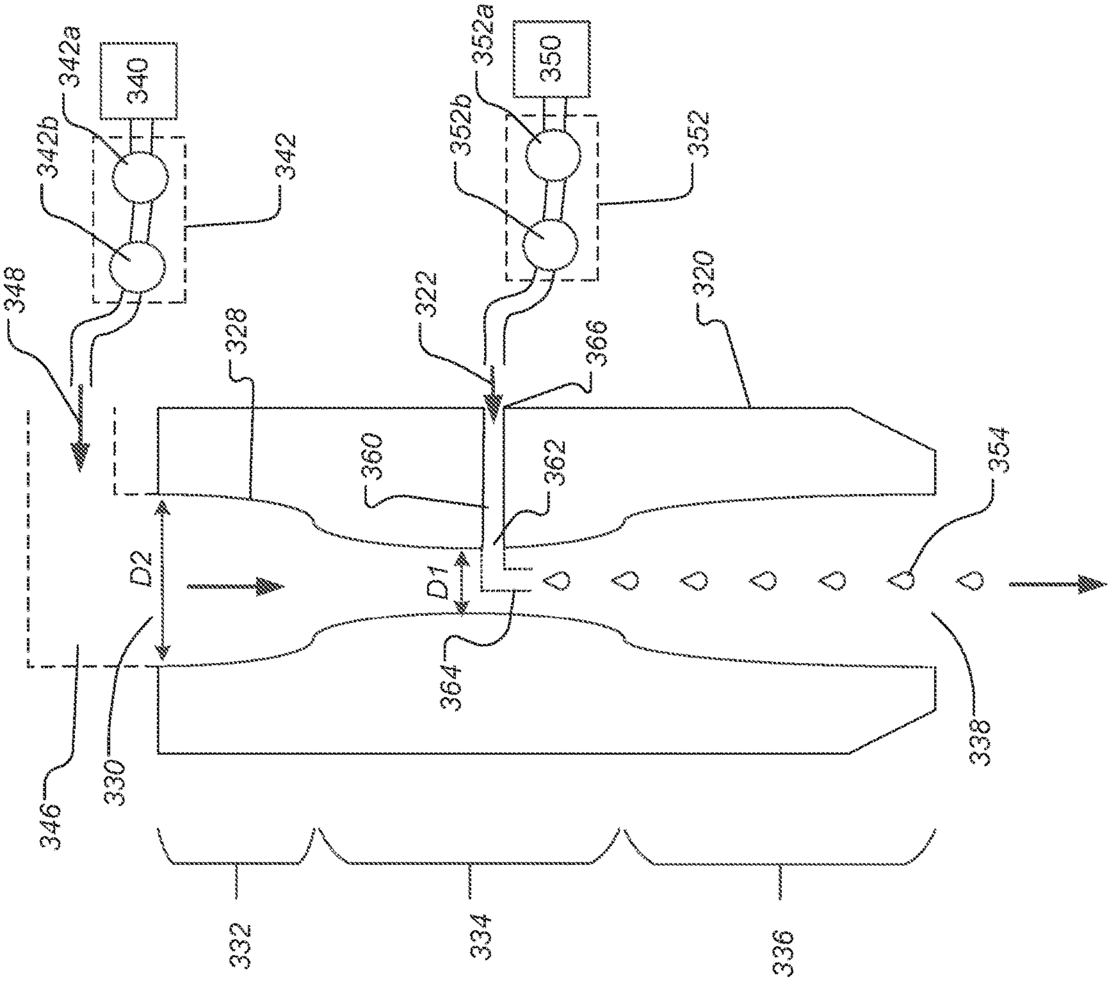
FIG. 5A illustrates a schematic cross-sectional view of a convergent-divergent nozzle.

Referring to FIG. 5A, each nozzle 320 can be a convergent-divergent (CD) nozzle. The convergent-divergent (CD) nozzle can also described as a de Laval nozzle or supersonic nozzle. Each nozzle 320 has a channel 328 therethrough that has an input port 330 where gas 348 (e.g., gas from a gas source 340) enters the nozzle 320. A flow rate and/or pressure of the carrier gas 348 into the input port 330 of nozzle 320 can be controlled by a gas flow regulator 342. The gas flow regulator 342 can be a pump 342*a*, one or more valves 342*b*, or a combination thereof, and optionally can include a pressure and/or mass flow sensor and microcontroller to control the pump 342*a* and/or valve 342*b* to achieve a desired carrier gas flow rate and/or pressure as set by the controller 90.

Figure 5C:
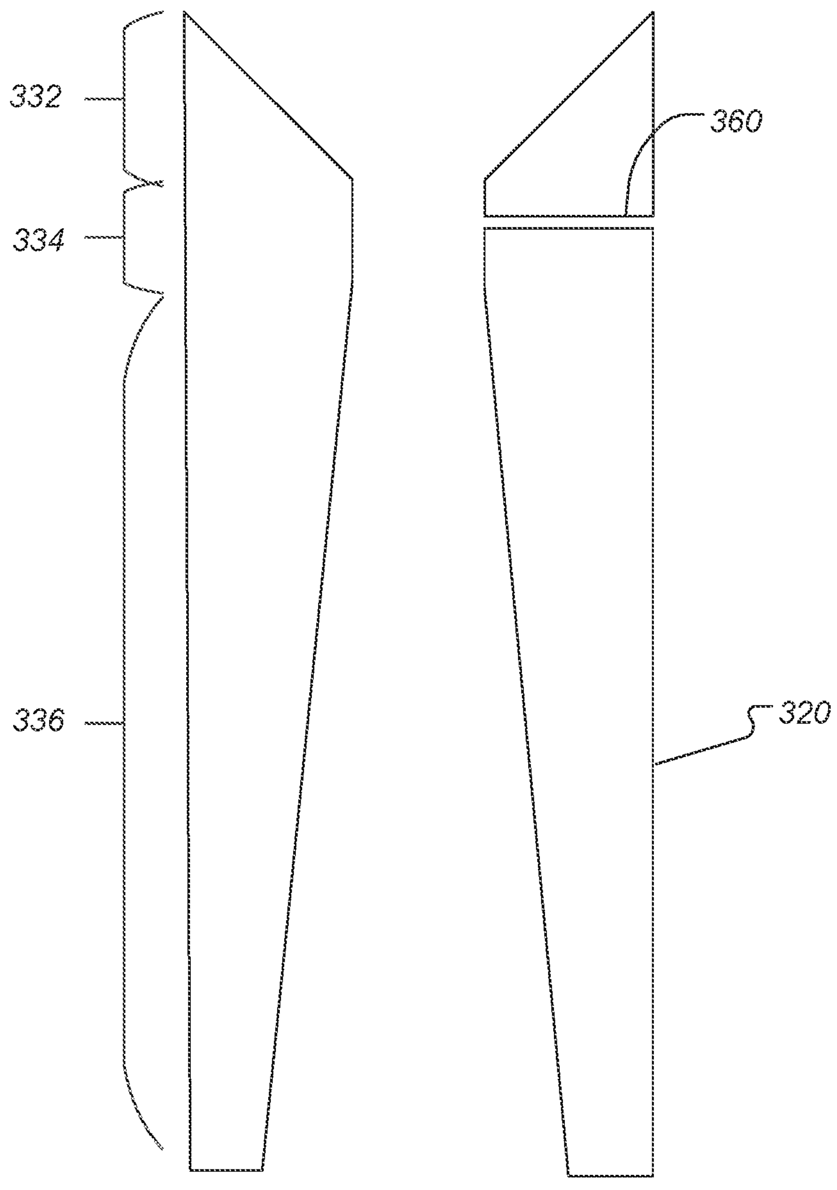
FIG. 5C illustrates a schematic cross-sectional view of another implementation of a convergent-divergent nozzle.

The input port 320 leads to a convergent section 332 where the channel through the nozzle 320 narrows. From the convergent section 332, the gas enters a choke-point, or throat 334, where the cross-sectional area of the nozzle 320 is at its minimum. In some implementations, the throat 334 has a concave curvature relative to the center line of the channel, as opposed to a convex curvature of the convergent section 332. However, other configurations are possible, e.g., the entire CD passage is concave. In addition, as shown in FIG. 5C, rather than being curved along the center line of the nozzle, the interior surfaces of the converging and diverging sections 332, 336 of the channel 328 can be simple conical surfaces. The interior surface of the throat sections 334 can be cylindrical, or be a conical surface with a smaller slope (relative to the center line of the channel) than the converging and diverging sections 332, 336.

The diameter of the channel 328 at the narrowest region can be 2 to 10 times less than the diameter of the channel 328 at the inlet port 330. The diameter of the channel 328 at the narrowest region can be 1.5 to 10 times less than the diameter of the channel 328 at the outlet port 338. The velocity of the gas increases as it flows from the convergent section 332, through the throat 33 and to a divergent section 336, and out an output port 338. The throat 334 causes the velocity of the gas flowing through the throat 334 to increase. In some implementations, the velocity of the gas is increased to supersonic speeds.

With the nozzle 320 being an atomizer, the cleaning liquid 322 flows from a cleaning liquid source 350 through an injection passage 360 into the channel 328. A flow rate and/or pressure of the cleaning fluid 348 into an injection port 366 of the injection passage 360 can be controlled by a liquid flow regulator 352. The liquid flow regulator 352 can be a pump 352*a*, one or more valves 352*b*, or a combination thereof, and optionally can include a pressure and/or mass flow sensor and microcontroller to control the pump 352*a* and/or valve 352*b* to achieve a desired cleaning fluid flow rate and/or pressure as set by the controller 90.

The injection passage 360 can simply end in an opening 362 that is flush with the sidewalls of the channel 328. Alternatively, the injection passage 360 can project (shown in phantom) into the channel 328, e.g., into the center of the channel 328. The injection passage 370 can be positioned to inject water droplets into the convergent section 332 (as shown in FIG. 5B), into the throat 334 (as shown in FIG. 5B), into the divergent section 336, or directly after the divergent section 206. The high velocity of the gas flow through the nozzle 320 atomizes the cleaning liquid 322 into droplets 354. The droplets are carried at high speed by the gas flow and can impinge the substrate at a velocity of 10-1200 m/s, e.g., 100-1000 m/s.

In order for the droplets 354 of cleaning liquid in the spray to impinge the substrate at sufficient velocity to performing cleaning (as opposed to simply rinsing), for a nozzle with a channel having a diameter D1 of 1.2 mm at the narrowest section of the throat 334, a diameter D2 of 4 mm at the inlet port, and a diameter D3 of 2.4 mm at the outlet port, the pump 342 (and/or valve 342*b*) can be set by the controller to deliver the carrier gas at a flow rate of 10-150 standard liters per minute (SLPM) per nozzle, and valve 352 can be set by the controller 90 to dispense water into the injection passage 360 at a flow rate of 5-500 cc/min per nozzle. The cleaning liquid flow rate (by volume) can be about 0.001% to 1%, e.g., 0.01 to 0.1% of the carrier gas flow rate.

Returning to FIG. 2B, a fluid jet cleaner 300 can be located in the transfer station 200. The fluid jet cleaner 300 can be suspended with the tops of the nozzles below the plane of the top surface 216 of the substrate support 212. Where the substrate support 212 includes an annular ring, e.g., as an edge support ring or as a ring to hold support pins, the fluid jet cleaner 300 can be located so that the nozzles 320 are positioned inside the inner diameter of the ring. This provides the nozzles with an unobstructed path for the spray 324 to reach the substrate 10.

The fluid jet cleaner 300 can be mounted on the load cup 210 or the substrate support 212 so that the support 310 and nozzles 320 move vertically with the load cup 210 or the substrate support 212 under the action of the actuator 214. Alternatively, the fluid jet cleaner 300 is not mounted on the load cup 210 or substrate support 212, but is independently movable by an actuator, e.g., actuator 312.

In operation, the substrate 10 can be sprayed by both the atomizing nozzles 320 of the fluid jet cleaner 300, and by the nebulizer nozzles 220. Thus, the substrate 10 can be impinged by liquids, e.g., the rinsing liquid and the cleaning liquid, at different pressures or energy densities. In particular, the cleaning liquid impinges the substrate 10 with higher pressure or energy density than the rinsing liquid. However, in some implementations just the fluid jet cleaner 300 is used or is present.

Returning to FIG. 1, fluid jet cleaner 300 can be located at an inter-platen station 240. The inter-platen station can operate similarly as the transfer station 200, but does not need a substrate support. The inter-platen station 240 can include a shield 242 to surround the fluid jet cleaner 300 to prevent spray deflected from the substrate from contaminating other components in the polishing system. The inter-platen station 240 can also include nebulizer nozzles 220 to rinse the substrate as discussed above.

Although converging-diverging atomizer nozzles have been discussed in the context of a face-down substrate held by a carrier head in a polishing system, the fluid jet cleaner 300 can be used in other situations. For example:

- It may be possible to direct fluid, e.g., the cleaning liquid, at sufficiently high pressure through a nebulizer nozzle, that the liquid droplets reach and impinge the substrate with similar energy density to the atomizer configuration discussed above.
- The substrate could be on a support other than the carrier head, e.g., on the support in the transfer station, when being sprayed by the fluid jet cleaner.
- The substrate can be held in a face-up position on such a support, with the fluid jet cleaner directing the cleaning liquid downward onto the substrate.
- The fluid jet cleaner could be used in a dedicated cleaner, rather than integrated into the polisher.
- Rather than the substrate moving, the substrate can be held fixed while the fluid jet cleaner moves to scan the substrate.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A chemical mechanical polishing system, comprising:
- a first polishing station including a first platen to support a first polishing pad;
- a transfer station to receive a substrate from a robot;
- a carrier head movable on a predetermined path from the first polishing station to the transfer station;
- a gas flow regulator having an input for a carrier gas;
- a liquid flow regulator having an input for a cleaning liquid;
- a fluid jet cleaner at a position along the predetermined path, the fluid jet cleaner including an atomizer nozzle including an input port coupled to the gas flow regulator, an injection port coupled to the liquid flow regulator, and an output port positioned to spray the cleaning liquid entrained in the carrier gas onto the substrate held by the carrier head when the carrier head is located above the fluid jet cleaner; and
- a nebulizer nozzle to spray a rinsing fluid on the substrate when the carrier head is located above the fluid jet cleaner.

2. The system of claim 1, wherein the fluid jet cleaner is positioned within the transfer station.

3. The system of claim 2, wherein the transfer station comprises a vertically movable substrate support.

4. The system of claim 3, wherein the atomizer nozzle is supported by and movable with the substrate support.

5. The system of claim 1, further comprising a second polishing station including a second platen to support a second polishing pad, and wherein the fluid jet cleaner is positioned at an interplaten station along the predetermined path between the first polishing station and the second polishing station.

6. The system of claim 1, comprising a controller configured to control the gas flow regulator and liquid flow regulator such that a first pressure of the spray of cleaning liquid on the substrate is greater than a second pressure of the spray of rinsing liquid on the substrate.

7. The system of claim 1, wherein the fluid jet cleaner includes a plurality of atomizer nozzles arranged in a line.

8. The system of claim 7, comprising a controller configured to control a motor that drives the carrier head along the predetermined path, and wherein the controller is configured to cause the motor to position the carrier head with the line of atomizer nozzles extending along a radius of the substrate held by the carrier head.

9. The system of claim 7, comprising a controller configured to cause the carrier head to rotate at a rotation rate to sweep the line of atomizer nozzles in an orbit around a center of the substrate while the atomizer nozzles spray the cleaning liquid on the substrate.

10. The system of claim 9, wherein the controller is configured to control the gas flow regulator and liquid flow regulator such that the spray of cleaning liquid on the substrate from each nozzle covers a width, and wherein a pitch between the plurality of atomizer nozzles is greater than the width.

11. The system of claim 10, wherein the controller is configured to cause the carrier head to oscillate laterally over the plurality of atomizer nozzles while the atomizer nozzles spray the cleaning liquid on the substrate.

12. A chemical mechanical polishing system, comprising:

a first polishing station including a first platen to support a first polishing pad;

a transfer station to receive a substrate from a robot, the transfer station including a substrate support;

a carrier head movable on a predetermined path from the first polishing station to the transfer station;

a gas flow regulator having an input for a carrier gas;

a liquid flow regulator having an input for a cleaning liquid;

a fluid jet cleaner positioned within the transfer station, the fluid jet cleaner including an atomizer nozzle including an input port coupled to the gas flow regulator, an injection port coupled to the liquid flow regulator, and an output port positioned to spray the cleaning liquid entrained in the carrier gas onto the substrate held by the carrier head when the carrier head is located above the fluid jet cleaner, the atomizer nozzle is supported by and movable with the substrate support;

a nebulizer in the transfer station to spray a rinsing fluid on the substrate; and a controller configured to control the gas flow regulator and liquid flow regulator such that a first pressure of the spray of cleaning liquid on the substrate is greater than a second pressure of the spray of rinsing liquid on the substrate.

13. The systems of claim 12, wherein the atomizer nozzle and a nebulizer nozzle of the nebulizer are mounted on a common support.

14. A chemical mechanical polishing system, comprising:

a first polishing station including a first platen to support a first polishing pad;

a transfer station to receive a substrate from a robot;

a carrier head movable on a predetermined path from the first polishing station to the transfer station;

a gas flow regulator having an input for a carrier gas;

a liquid flow regulator having an input for a cleaning liquid;

a fluid jet cleaner at a position along the predetermined path, the fluid jet cleaner including a plurality of atomizer nozzles arranged in a line with each atomizer nozzle including an input port coupled to the gas flow regulator, an injection port coupled to the liquid flow regulator, and an output port positioned to spray the cleaning liquid entrained in the carrier gas onto the substrate held by the carrier head when the carrier head is located above the fluid jet cleaner, a controller configured to cause the carrier head to rotate at a rotation rate to sweep the line of atomizer nozzles in an orbit around a center of the substrate while the atomizer nozzles spray the cleaning liquid on the substrate, wherein the gas flow regulator and liquid flow regulator such that the spray of cleaning liquid on the substrate from each nozzle covers a width, and wherein a pitch between the plurality of atomizer nozzles is greater than the width, and wherein the controller is configured to cause the carrier head to oscillate laterally at an oscillation frequency that is lower than the rotation rate of the carrier head.

15. The system of claim 14, wherein the rotation rate is two to and twenty times larger than the oscillation frequency.

16. The system of claim 14, wherein the controller is configured to control the gas flow regulator and liquid flow regulator such that the cleaning liquid exits the nozzle at 100-1200 m/s.

17. The system of claim 14, wherein the controller is configured to control the gas flow regulator such that a flow rate of the carrier gas into the atomizer nozzle is between 10 and 150 SLPM and a flow rate of the cleaning liquid into the atomizer nozzle is between 5 and 500 cc/min.

18. The system of claim 14, comprising a gas source coupled to the input of the gas flow regulator, and comprising the carrier gas, and wherein the carrier gas is air, nitrogen, carbon dioxide, or an inert gas.

19. The system of claim 14, comprising a liquid source coupled to the input of the liquid flow regulator, and comprising the cleaning liquid, and wherein the cleaning liquid is water.

20. The system of claim 14, wherein the atomizer nozzle comprises a convergent-divergent nozzle.

21. The system of claim 14, wherein a ratio of a diameter of a channel through the nozzle at the input port to a diameter of the channel at a narrowest portion of a throat of the channel is between 2 and 10.

* * * * *